Sept. 1, 1959 M. PELLADEAU 2,901,978
DEVICE USABLE AS A TORQUE VARIATOR, PUMP, COMPRESSOR,
METER, MOTOR, TURBINE, CLUTCH AND BRAKE
Filed May 18, 1954 3 Sheets-Sheet 1

INVENTOR
MAURICE PELLADEAU

By
*[signature]*
ATTORNEYS

INVENTOR
MAURICE PELLADEAU

Sept. 1, 1959　　　　　M. PELLADEAU　　　　　2,901,978
DEVICE USABLE AS A TORQUE VARIATOR, PUMP, COMPRESSOR,
METER, MOTOR, TURBINE, CLUTCH AND BRAKE
Filed May 18, 1954　　　　　　　　　　　　　3 Sheets-Sheet 3
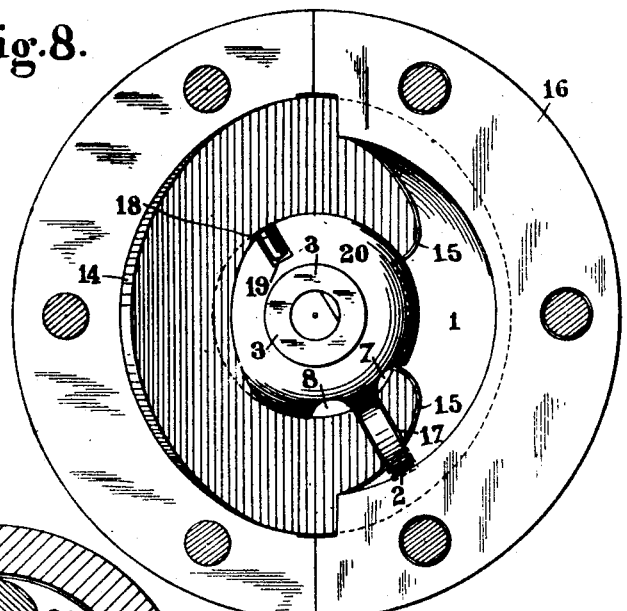
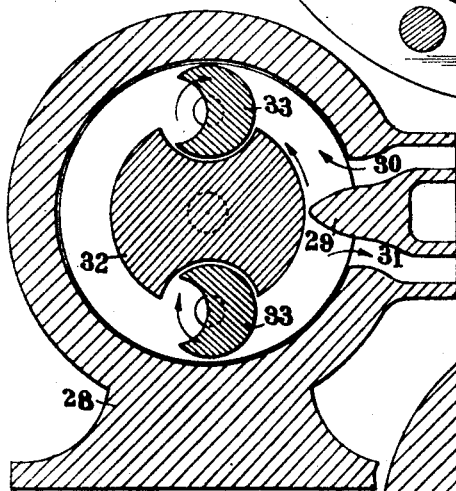
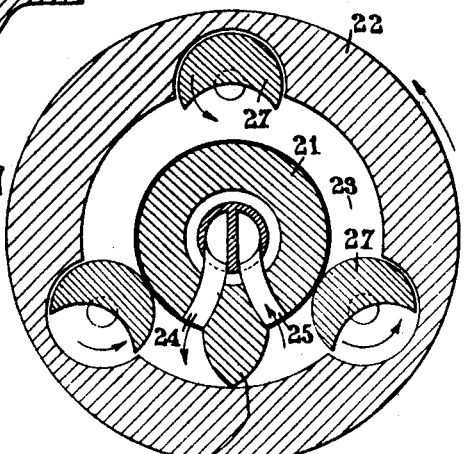
INVENTOR
MAURICE PELLADEAU
ATTORNEYS United States Patent Office 2,901,978
Patented Sept. 1, 1959

2,901,978

DEVICE USABLE AS A TORQUE VARIATOR, PUMP, COMPRESSOR, METER, MOTOR, TURBINE, CLUTCH AND BRAKE

Maurice Pelladeau, Paris, France, assignor of one-half to Standard Research Consultants, Inc., New York County, N.Y.

Application May 18, 1954, Serial No. 430,644

5 Claims. (Cl. 103—125)

The object of the present invention is a machine comprising a revolution enclosure, generated by a closed curve such as a torus, for instance, rotating about an axis outside said curve, at least one piston inside said enclosure, to which is imparted, with respect to the walls of this enclosure, a relative motion of circular translation, means for closing this enclosure at one point at least and dividing it into at least two sectors, one back of the piston where it causes a suction, the other one in front of the piston where it creates a compression, an entrance orifice for the fluid into the enclosure, immediately back of the piston, an outlet orifice for the fluid out of the enclosure immediately in front of the piston, the means for closing the enclosure at one point at least being arranged for being effaced upon the passing of the piston. It will be realized that in such a machine the inlet and outlet orifices are never stopped and the piston is always subjected to the constant stress of the fluid, a constant stress is always transmitted to it, even when it passes through the means closing the enclosure for passing from one sector of this enclosure to the next one.

According to one mode of embodiment, the piston is associated with a central rotary shaft, the axis of which coincides with that of a volume of revolution constituting the enclosure, the ducts for the fluid inlet and outlet are provided in this central shaft, and the means for closing the enclosure at one point at least and dividing it into at least two sectors are constituted by a disc going through the center of the volume of revolution, thus dividing the enclosure into two symmetrical regions, penetrating, to this effect, in the enclosure through slots provided in the walls of the enclosure, possibly inclined with respect to the central shaft, driven in rotation in its plane and about its center in synchronism with the central shaft and comprising a slot, in which said piston is engaged, and through which it passes every time that, during its rotation, it intersects the plane of the disc.

The means of embodiment of the piston and the means for closing the enclosure at one point at least may be extremely varied.

Thus, in particular, the piston may be fixed, and the means of closure rotary, or vice versa, the central shaft may be fixed, and the outer portion of the machine rotary, or vice versa, the piston may be associated with the central shaft or the outer portion of the machine and the means of closure of the machine may be constituted by discs having their axes parallel with that of the enclosure, the thickness of which is equal at least to that of the enclosure, mounted for rotation about their axes and comprising a notch in which the piston finds a housing each time it comes in register with the disc which enables it to pass from one sector of the enclosure to the next one, from one side to the other of the closure.

The number of these closure means may be more or less large according to whether it is desired to divide the enclosure into a greater or lesser number of different sectors.

Such a machine makes it possible to entirely control a liquid vein (gaseous in some cases) to absorb energy therefrom or to supply some thereto, to suck it in, to compress it, to control its rate of flow, to brake its flow or to accelerate it; conversely, if the liquid or gaseous vein flows through the machine under pressure, the latter operates as a motor or a meter according to the use intended. On the other hand, by connecting the inlet circuit and the outlet circuit by means of a valve, the gradual closing of the latter will cause a braking of the liquid vein and then a stopping of the assembly; thus it is possible to constitute a clutch.

Similarly, if it is used as a brake, the closing of the valve causes a stopping of the rotation of the apparatus or its slowing down by the decrease in the flow of the liquid vein through the valve; finally by operating with some degree of closure, variable according to cases, a torque variator is obtained.

The output of this machine which is strictly constant for each revolution of the shaft, is thus proportional to the speed of rotation.

The liquid is neither stirred nor emulsified, it is pushed and sucked regularly in an endless cylinder (annulus) without any valve or flap, hence with no interruption, the suction side of the element being constantly in contact with the outside of the apparatus through the liquid vein, and the compression side of the element being also constantly in contact with the outside of the apparatus through the liquid vein. This absence of any valve or flap allows a perfectly uniform output even at every slow speeds. The liquid vein which flows through the apparatus is interrupted only by one part which ensures its control. The apparatus being stopped, the circuit is cut-off, no liquid flows through the apparatus. Conversely, if the inlet to the apparatus is closed and the outlet of the apparatus is operating, the apparatus stops.

The appended drawing shows, by way of example, various types of embodiment of the present invention.

Figure 8 is a view in plan, the upper portion of the casing being supposed removed, and the elements in another orientation than in Figure 6.

Figure 9 is a view, in section, of a machine with a central shaft and a fixed piston.

Figure 10 is a vertical sectional view of a further modification of the present invention.

Figure 1:
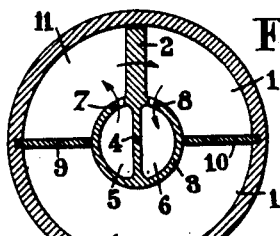
Figures 1 to 3 are diagrammatic views showing the operating principle of the invention.
Figure 2:
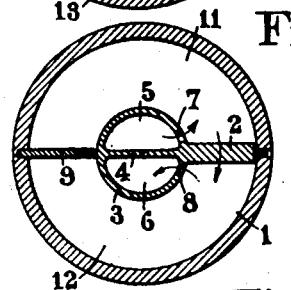
Figure 3:
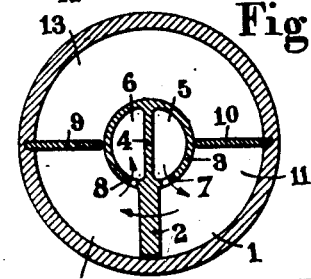
Figure 4:
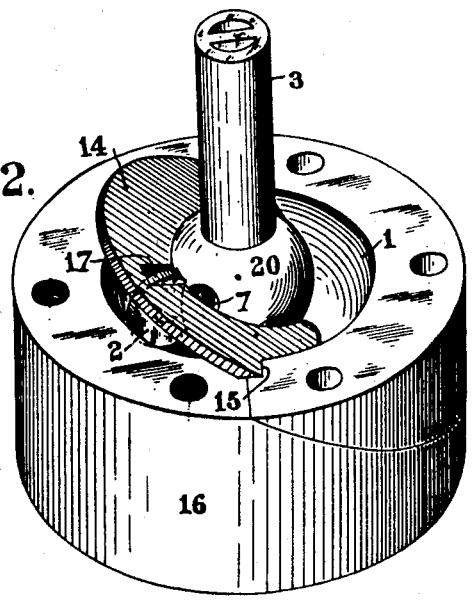
Figure 4 is a view in perspective of a first type of embodiment, after removal of part of the casing.
Figure 5:
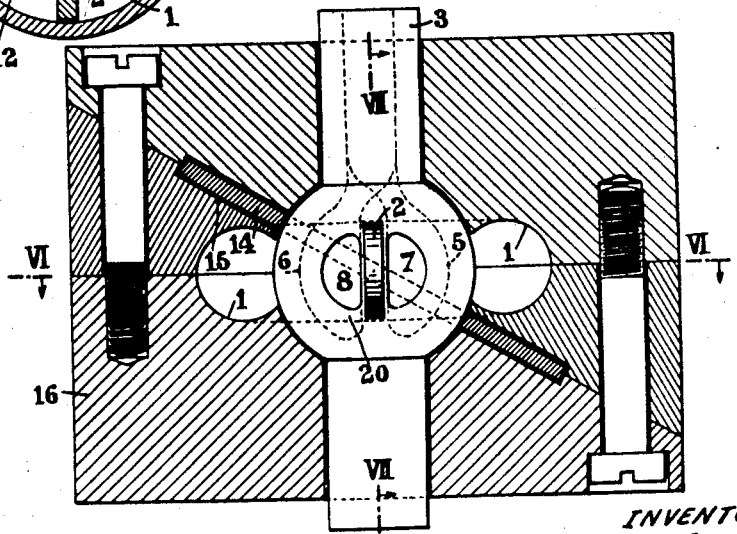
Figure 5 is a view in section through a longitudinal plane going through the axis of the central shaft.
Figure 6:
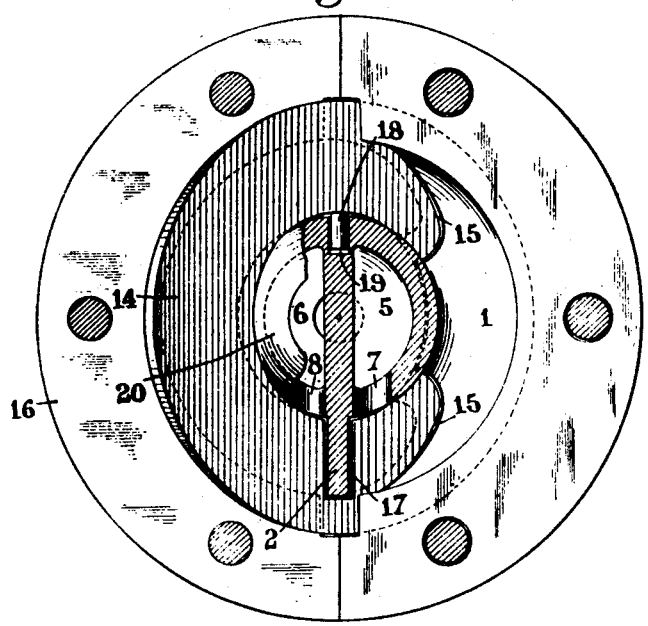
Figure 6 is a view partly in transverse section, made along the line VI—VI in Figure 5, partly in plan, the upper portion of the casing being supposed removed.
Figure 7:
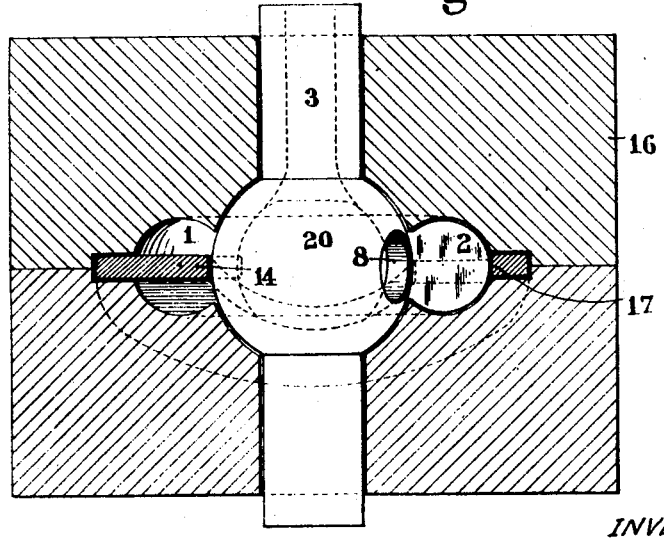
Figure 7 is a view in section through a longitudinal plane, along the line VII in Figure 5.

In the diagram shown in Figures 1 to 3, the working chamber 1, a volume of revolution, is gone through by a piston 2, which is driven in a circular translation motion, and associated to this effect with the rotary shaft 3, divided by the diametral partition 4 into a suction side 5 and a forcing side 6, communicating with the working chamber 1 through corresponding orifices 7 and 8 located on both sides of the piston 2.

The working chamber is closed at 9 and 10 by partitions which are arranged so as to be effaced when the piston 2 passes.

The assembly therefore constitutes a cylinder, through which a piston moves continuously, wherein there is constantly an enclosure 11 back of the piston for suction, an enclosure 12 in front of the piston for compression and an enclosure 13 diametrally opposite the piston for balancing, except at the time of going through the partitions 9 and 10 at which time the balancing enclosure becomes a forcing circuit and the compression enclosure becomes a balancing circuit.

For obtaining the passage through the shutter of the piston 2, this shutter may be constituted, as shown in Figures 4 to 8, by an inclined disc 14, driven in rotation by the shaft 3 with the piston, and held in its plane by grooves 15 provided to this effect in the casing 16, half of which is supposed to have been removed for showing the inside of the apparatus and particularly the toroid chamber 1, closed at two diametrally opposite points by the inclined disc 14, constituting therefore the two partitions 9 and 10 of the above diagram. A radial slot 17 is provided in the disc through which the piston 2 passes for going from one side of the disc 14 to the other side during their simultaneous rotation. The disc is further driven and guided by a radial stud 18 secured thereto, engaging a radial slot 19 provided in the spherical central portion 20 of the shaft 3, comprising orifices 7 and 8 for suction and forcing. It will be realized that the relative motion between the inclined disc 14 and piston 2, both driven in rotation with the shaft 3, is a motion of oscillation of the disc about an axis normal to the piston, going through the center of the apparatus, and that the piston, therefore, goes alternately twice through the slot 17 of the disc, from one side to the other, then conversely during a rotation through a complete revolution; one thus has, as shown in the diagram, two closing partitions for a circular working chamber which are effaced for allowing the piston to pass.

The machine represented in Figure 9 comprises a fixed shaft 21 and a motor 22 rotating in the direction of the arrow, limiting between them a space 23; the fixed shaft 21 is hollow, and allows the passing of an inlet or suction duct for the fluid opening at 24, and to an output or forcing duct opening at 25, the orifices 24 and 25 being arranged on both sides of the stationary piston 26.

The three shutters 27 are driven in rotation by the rotor 22 and simultaneously, in the direction of the arrow, about their axis which is parallel with that of the rotor, and tangent, outside to the enclosure 23 in such a manner that their circular tearing off allows the passing of the piston 26.

In the mode of embodiment shown in Figure 10, the frame 28 is fixed like the stationary piston 29 surrounded by the inlet shaft 30 and outlet shaft 31 for the fluid; the shaft 32 is rotary and drives in rotation the shutters 33 which also rotate in synchronism in the direction of the arrow about their axis tangent, inside, to the enclosure.

In both cases, the enclosure is divided into three zones, two of which active and one neutral, but in the first case the neutral zone occupies two thirds of its total volume while in the second case it occupies only one half.

The radius of the enclosure, inside in the first case and outside in the second case and that of the shutter can be so selected that the outer surface of the shutter rolls without any gliding on the surface of the enclosure.

The means for driving in rotation the shutters have not been described inasmuch as the diagrams are only intended to show the multiple possibilities of embodiment of the invention.

What I claim is:

1. In a rotary engine, a casing having an annular chamber formed therein, a shaft extending into said casing and having parallel extending discharge and suction passages formed in one end thereof therein, said passages being located in side by side relation and terminating at the central portion of said shaft and communicating with said annular chamber to define suction and discharge ports, a flat piston secured to said shaft and positioned in said annular chamber in sealing and bearing relation for rotary movement therein, an annular groove inclined with respect to the longitudinal axis of said shaft formed in said casing, and a flat disc positioned in said groove in bearing relation therewith and operatively engaging said piston for rotation therewith, the plane of said disc being inclined with respect to the plane of said piston, said disc extending through said annular chamber and cooperating with said piston to divide said annular chamber into two symmetrical working chambers that define suction and discharge volumes in said annular chamber, said suction and discharge volumes varying as the angle between the planes of said disc and piston varies during rotation of said disc and piston, and said suction and discharge ports communicating with the suction and discharge volumes for moving a fluid medium therethrough.

2. In a rotary engine as set forth in claim 1, wherein said disc is formed with a slot therein, said piston extending into said slot, thereby drivingly engaging said disc.

3. A rotary engine comprising a casing having a central chamber formed therein, a toroidal chamber formed in said casing adjacent said central chamber and communicating therewith, the axis of generation of said toroidal chamber being perpendicular to the axis of said central chamber, a shaft journalled for rotation in said casing and having an enlarged portion formed integral therewith, said enlarged portion being positioned in said central chamber in sealing and bearing relation, one end of said shaft being hollow and being divided by a longitudinally extending partition to provide parallel suction and discharge passages therein, said passages terminating at said enlarged portion and defining a suction port and a discharge port, respectively, a flat piston secured to said enlarged portion between said ports and rotatable with said enlarged portion, said piston extending into said toroidal chamber in sealing and bearing relation and rotatable therein, and a flat disc positioned in said casing in bearing relation and slidably engaging said piston in sealing relation for rotation therewith, the plane of said disc being inclined with respect to the plane of said piston, and the angle between said planes continuously varying as said disc and piston rotate, said disc extending through said toroidal chamber and cooperating with said piston to divide said toroidal chamber into two symmetrical working chambers that define suction and discharge volumes that are continuously varied as said disc and piston rotate, said suction and discharge ports continuously receiving and discharging a fluid medium as said shaft rotates.

4. In a rotary engine, a casing having a central chamber formed therein, a shaft journalled for rotation in said casing and having an enlarged portion formed integral therewith, said enlarged portion positioned in said central chamber in sealing relation and occupying substantially the entire volume thereof, a toroidal chamber formed in said casing adjacent said central chamber and communicating therewith, a flat planar-like piston secured to the enlarged portion of said shaft and rotatable therewith, said piston extending into said toroidal chamber and rotatable therein, the axis of revolution of said piston being coaxial with the axis of generation of said toroidal chamber and the edges of said piston engaging the walls of said toroidal chamber in bearing relation, an annular groove formed in said casing adjacent said central chamber and communicating therewith, the central axis of said groove being inclined with respect to the axis of revolution of said piston, a flat planar-like disc positioned in said groove in bearing relation, said disc having a central opening the edge of which engages the enlarged portion of said shaft in sealing relation, the plane of said disc being inclined with respect to the plane of said piston, a slot formed in said disc and communicating with the central opening thereof, said slot receiving said piston in sliding and sealing engagement therewith, said piston and disc rotatable together with said shaft, the angle between the planes thereof continuously varying as said piston and disc rotate, said disc extending through said toroidal chamber and cooperating with said piston to divide said toroidal chamber into two symmetrical working chambers, discharge and suction ports formed in said enlarged portion, and separated from each other by said piston, each of said ports communicating with one of said working chambers and being continuously covered and uncovered by said angularly rotating disc, said working chambers thereby defining suction and discharge volumes that continuously change as said disc and piston rotate, and discharge and suction passages formed in one end of said shaft and communicating with said discharge and suction ports respectively, said passages being parallel and located in side-by-side relation.

5. In a rotary engine, a casing having an annular chamber formed therein, a shaft journalled for rotation in said casing including a central portion and having a flat planar-like piston secured thereto at the central portion thereof, said piston extending into said annular chamber and rotatable therein, the axis of revolution of said piston being coaxial with the axis of generation of said annular chamber, and the edges of said piston engaging the walls of said annular chamber in bearing relation, an inclined annular groove formed in said casing, a flat planar-like disc positioned in said groove in bearing relation therewith, said disc engaging the central portion of said shaft in sealing relation therewith, the plane of said disc being inclined with respect to the plane of said piston, said disc operatively engaging said piston in sealing and bearing relation for rotation therewith and movement relative thereto, said disc extending through said annular chamber and cooperating with said piston to divide said annular chamber into two symmetrical working chambers, the relative movement of said disc defining an oscillating motion about an axis perpendicular with respect to the plane of said piston, whereby the angle between the planes of said disc and piston are continuously varied during the rotation thereof, discharge and suction ports formed in the central portion of said shaft and separated from each other by said piston, each of said ports communicating with one of said working chambers and being continuously covered and uncovered by the angularly rotating disc, said working chambers thereby defining suction and discharge volumes that continuously change as said disc and piston rotate, and discharge and suction passages formed in one end of said shaft and communicating with said discharge and suction ports respectively, said passages being parallel and located in side-by-side relation.

References Cited in the file of this patent

UNITED STATES PATENTS

| | | |
|---|---|---|
| 206,698 | Barber | Aug. 6, 1878 |
| 263,975 | Siegrist | Sept. 5, 1882 |
| 652,044 | Rohde | June 19, 1900 |
| 1,686,285 | Mason | Oct. 2, 1928 |
| 1,773,635 | Simmons | Aug. 19, 1930 |
| 2,043,544 | Kempthorne | June 9, 1936 |
| 2,091,577 | Adler et al. | Aug. 31, 1937 |
| 2,181,962 | Booth | Dec. 5, 1939 |
| 2,242,058 | Cuny | May 13, 1941 |
| 2,318,386 | Haines | May 4, 1943 |
| 2,397,139 | Heaton | Mar. 26, 1946 |
| 2,416,396 | Landrum | Feb. 25, 1947 |

FOREIGN PATENTS

| | | |
|---|---|---|
| 209,752 | Germany | May 8, 1909 |
| 388,342 | Great Britain | Feb. 23, 1933 |